United States Patent
Onoda et al.

(10) Patent No.: US 7,107,862 B2
(45) Date of Patent: Sep. 19, 2006

(54) TORQUE SENSOR ASSEMBLING METHOD, TORQUE SENSOR AND ELECTRIC POWER STEERING DEVICE

(75) Inventors: Jun Onoda, Okazaki (JP); Takuo Shibata, Okazaki (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 150 days.

(21) Appl. No.: 10/910,648

(22) Filed: Aug. 4, 2004

(65) Prior Publication Data

US 2005/0028613 A1 Feb. 10, 2005

(30) Foreign Application Priority Data

Aug. 5, 2003 (JP) .............................. 2003-287022

(51) Int. Cl.
*G01L 3/02* (2006.01)
(52) U.S. Cl. ...................... 73/862.331; 73/862.321; 73/862.326; 73/862.333; 73/862.334
(58) Field of Classification Search ........... 73/892.331, 73/862.334, 862.326, 862.321, 862.333
See application file for complete search history.

(56) References Cited

U.S. PATENT DOCUMENTS 6,260,422 B1    7/2001  Odachi et al.

2003/0056606 A1 * 3/2003 Matsuura et al. ...... 73/862.191

FOREIGN PATENT DOCUMENTS

| EP | 1 298 032 A2 | 4/2003 |
|---|---|---|
| EP | 1 325 858 A2 | 7/2003 |
| JP | 10-328952 | 12/1998 |

* cited by examiner

*Primary Examiner*—Edward Lefkowitz
*Assistant Examiner*—Freddie Kirkland, III
(74) *Attorney, Agent, or Firm*—Oblon, Spivak, McClelland, Maier & Neustadt, P.C.

(57) ABSTRACT

A method of assembling a torque sensor includes the steps of fixing a first inner coil portion at one end side of a torsion bar, fixing a second inner coil portion at an other end side of the torsion bar, measuring an angle difference between an angle of the first inner coil portion and an angle of the second inner coil portion, fixing a first outer coil portion and a second outer coil portion, of which angle difference is substantially equivalent to the measured angle difference between the first inner coil portion and the second inner coil portion, at a housing, and rotatably disposing the torsion bar fixed with the first inner coil portion and the second inner coil portion in the housing.

12 Claims, 9 Drawing Sheets

TORQUE SENSOR ASSEMBLING METHOD, TORQUE SENSOR AND ELECTRIC POWER STEERING DEVICE

CROSS REFERENCE TO RELATED APPLICATIONS

This application is based on and claims priority under 35 U.S.C. §119 with respect to a Japanese Patent Application 2003-287022, filed on Aug. 5, 2003, the entire content of which is incorporated herein by reference.

FIELD OF THE INVENTION

This invention generally relates to a method of assembling a torque sensor, a torque sensor and an electric power steering device, each of which enables obtaining a torque applied to a torsion bar based upon an angle difference between a first angle detected by a resolver equipped at one end side of the torsion bar and a second angle detected by the other resolver equipped at the other end side thereof.

BACKGROUND

In general, a resolver is provided with an inner coil portion rotatably disposed inside an outer coil portion. The resolver detects a rotational angle of a rotor based upon a change of a mutual inductance between the inner coil portion and the outer coil portion. Therefore, as described in Japanese Patent Laid-Open Publication No. 1998-328952, this type of resolver is applied for a servo motor and acts to detect a rotational angle of a motor shaft.

Recent developments have lead to a torque sensor capable of detecting a torque corresponding to a torsion angle of a torsion bar rotatably disposed in a housing based upon an angle difference between a first angle detected by a first resolver equipped at one end of the torsion bar and a second angle detected by a second resolver equipped at the other end of the torsion bar.

More particularly, in the resolvers of the aforementioned torque sensor, a rotor having the inner coil portion and a stator having the outer coil portion are arranged to match a reference point of the rotor with a reference point of the stator. The first resolver is equipped at the one end side of the torsion bar, while the second resolver is equipped at the other end side thereof. In assembling this torque sensor, the stators of the first and second resolvers are positioned so as to match a reference position of the stator of the first resolver with a reference position of the stator of the second resolver. The first and second resolvers are then equipped at the housing. The rotors of the first and second resolvers are also positioned so as to match a reference position of the rotor of the first resolver with a reference position of the rotor of the second resolver. The first and second resolvers are then equipped at the torsion bar. Following to the above processes, the torsion bar is rotatably disposed in the housing so as to build the torque sensor. In this case, the stators are equipped at the housing by a positioning jig. Therefore, the stators having the outer coil portions can be relatively highly precisely assembled with the reference positions matched. However, the rotors having the inner coil portions may not be positioned at the right reference positions due to torsion of the torsion bar upon assembling the rotors at the torsion bar. Further, each rotor may contain variations upon being manufactured, wherein a deviance between the two rotors may be further increased. As a result, an unnecessary angle difference may occur between the angle detected by the first resolver and the angle detected by the second resolver, wherein a torque of the torsion bar may be calculated counting in the unnecessary angle difference.

For example, when an electric power steering device for a vehicle is provided with this type of torque sensor having the relatively large angle difference, a torque sensor adjustment or a vehicle adjustment by a vehicle manufacturer may not be able to be effectively performed due to a reaction torque corresponding to the torque calculated counting in the unnecessary angle difference. Conventionally, this sort of problem has been prevented from occurring by defining a certain standard that can be a parameter for judging whether the torque sensor is a finished product or a not applicable product. When the torque sensor does not satisfy the standard, the torque sensor has been discarded.

However, it has been difficult to assemble the rotor with high assembling precision in accordance with the conventional assembling method. Therefore, even if the certain standard is defined as described above, it has been still difficult to satisfy the standard, thereby deteriorating a production capability, discarding the torque sensor not satisfying the standard and causing excessive manufacturing cost.

A need exists for providing a method of assembling a torque sensor, a torque sensor and an electric power steering device, each of which enables reducing a manufacturing cost and improving a production capacity.

SUMMARY OF THE INVENTION

According to an aspect of the present invention, a method of assembling a torque sensor includes the steps of fixing a first inner coil portion at one end side of a torsion bar, the first inner coil portion being rotatable with the torsion bar, fixing a second inner coil portion at an other end side of the torsion bar, the second inner coil portion being rotatable with the torsion bar, measuring an angle difference between a circumferential directional angle of the first inner coil portion and a circumferential directional angle of the second inner coil portion, fixing a first outer coil portion and a second outer coil portion at a housing so as to set a difference between a circumferential angle difference between the first outer coil portion and the second outer coil portion and the measured angle difference between the first inner coil portion and the second inner coil portion within a reference value, and rotatably disposing the torsion bar fixed with the first inner coil portion and the second inner coil portion in the housing.

The first inner coil portion and the first outer coil portion configures a first resolver adjusted to detect a rotational angle of the torsion bar based upon a change of a mutual inductance between the first inner coil portion and the first outer coil portion. The second inner coil portion and the second outer coil portion configures a second resolver adjusted to detect a rotational angle of the torsion bar based upon a change of a mutual inductance between the second inner coil portion and the second outer coil portion, and a torque applied to the torsion bar is obtained based upon a difference between the rotational angle of the torsion bar detected by the first resolver and the rotational angle of the torsion bar detected by the second resolver.

It is preferable that the housing having the first outer coil portion and the second outer coil portion is assembled at the torsion bar so as to set the circumferential angle difference between the first outer coil portion and the second outer coil portion substantially equivalent to the measured angle difference between the first inner coil portion and the second inner coil portion.

According to another aspect of the present invention, a torque sensor includes a torsion bar rotationally disposed in a housing, a first outer coil portion fixed at the housing, a second outer coil portion fixed at the housing, a first inner coil portion fixed at the torsion bar, a second inner coil portion fixed at the torsion bar, a first resolver having the first outer coil portion and the first inner coil portion and fixed at one end side of the torsion bar, the first resolver adjusted to detect a rotational angle of the torsion bar based upon a change of a mutual inductance between the first outer coil portion and the first inner coil portion, and a second resolver having the second outer coil portion and the second outer coil portion and fixed at an other end side of the torsion bar, the second resolver adjusted to detect a rotational angle of the torsion bar based upon a change of a mutual inductance between the second outer coil portion and the second inner coil portion. An angle difference between a circumferential directional angle of the first outer coil portion and a circumferential directional angle of the second outer coil portion is substantially equivalent to an angle difference between a circumferential directional angle of the first inner coil portion and a circumferential directional angle of the second inner coil portion such that a torque applied to the torsion bar is detected based upon a difference between the angle detected by the first resolver and the angle detected by the second resolver.

According to further aspect of the present invention, the above-described torque sensor is connected to a steering shaft rotated in response to an operation of a steering wheel, in an electric power steering device.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described hereinbelow in detail with reference to the accompanying drawings.

Figure 1:
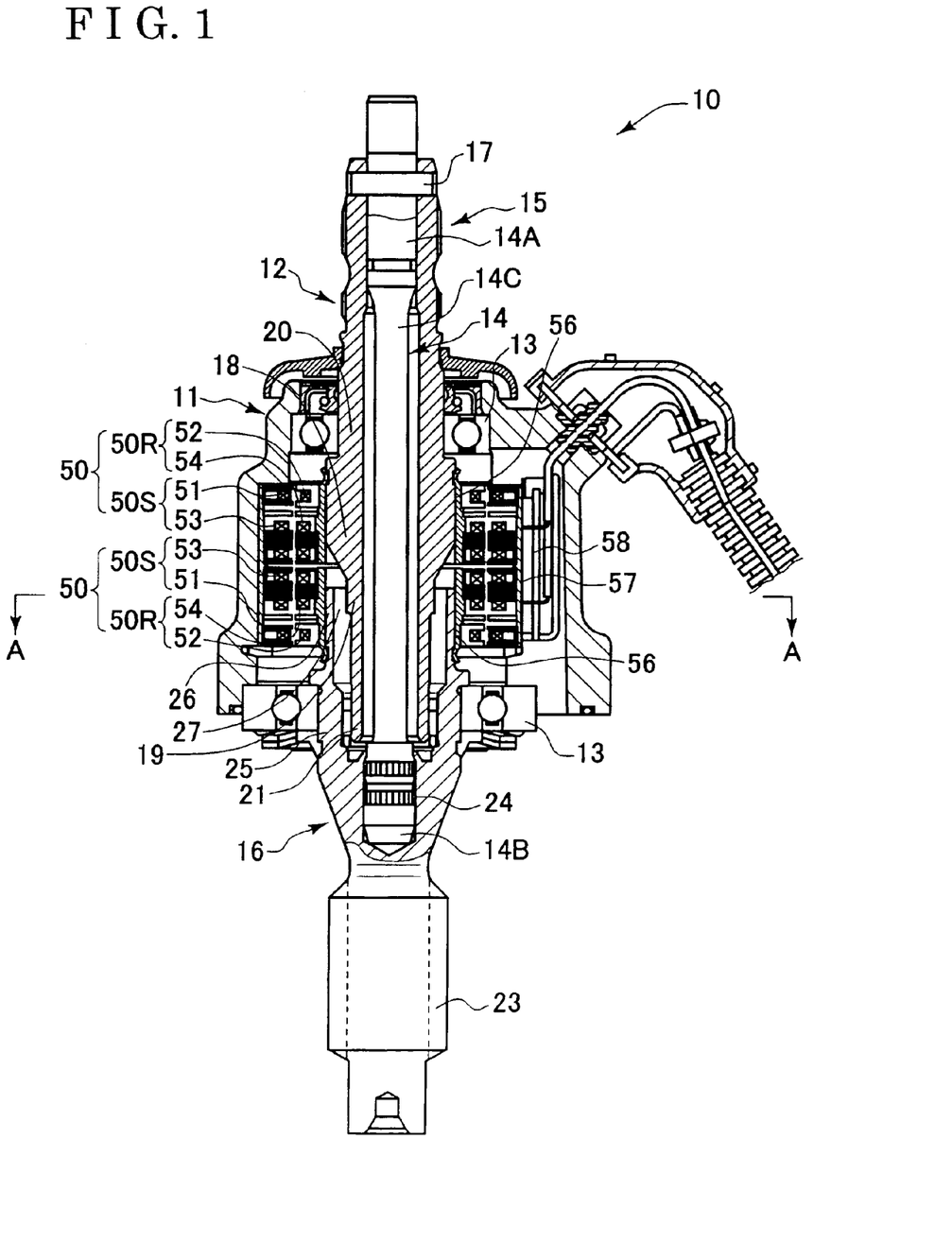
FIG. 1 is a sectional view illustrating an entire structure of a torque sensor according to embodiments of the present invention.

As illustrated in FIG. 1, a torque sensor 10 according to a first embodiment of the present invention is provided with an approximately cylindrical body 11 (i.e., a housing) and a rotational shaft portion 12 axially penetrating in the cylindrical body 11. The rotational shaft portion 12 is rotatably supported by bearings 13 and 13 arranged at axially end portions of the cylindrical body 11.

The rotational shaft portion 12 includes a torsion bar 14, a first extending sleeve 15 and a second extending sleeve 16. The torsion bar 14 includes an end portion 14A, an end portion 14B and an intermediate portion 14C. A diameter of the intermediate portion 14C is designed to be smaller than diameters of the end portions 14A and 14B. When a torque is applied to the torsion bar 14, the intermediate portion 14C is twisted and deformed.

The first extending sleeve 15 covers an approximately entire surface of the intermediate portion 14C of the torsion bar 14. There is a predetermined clearance defined between an outer surface of the intermediate portion 14C and an inner surface of the first extending sleeve 15, wherein the intermediate portion 14C is idly fitted into the first extending sleeve 15. There is no clearance defined between the end portion 14A (hereinafter, referred to as a base end portion 14A) and the first extending sleeve 15, wherein the base end portion 14A is fitted into the first extending sleeve 15. A pin 17 penetrates in a radial direction at the fitted portion of the base end portion 14A into the first extending sleeve 15. Therefore, the first extending sleeve 15 rotates integrally with the base end portion 14A of the torsion bar 14.

At an outer peripheral surface of the first extending sleeve 15, there is a bearing fitting portion 20 fitting the bearing 13, a first resolver fitting portion 18 arranged at the end portion 14B (hereinafter, referred to as a tip end portion 14B) rather than at a side of the bearing fitting portion 20, a first stopping portion 19 arranged at the side of the tip end portion 14B rather than at a side of the first resolver fitting portion 18, and a small diameter portion 21 adjacent to the tip end portion 14B. A major diameter of the first stopping portion 19 is smaller than a major diameter of the first resolver fitting portion 18. A major diameter of the small diameter portion 21 is smaller than any diameters of the bearing fitting portion 20, the first resolver fitting portion 18 and the first stopping portion 19.

Figure 2:
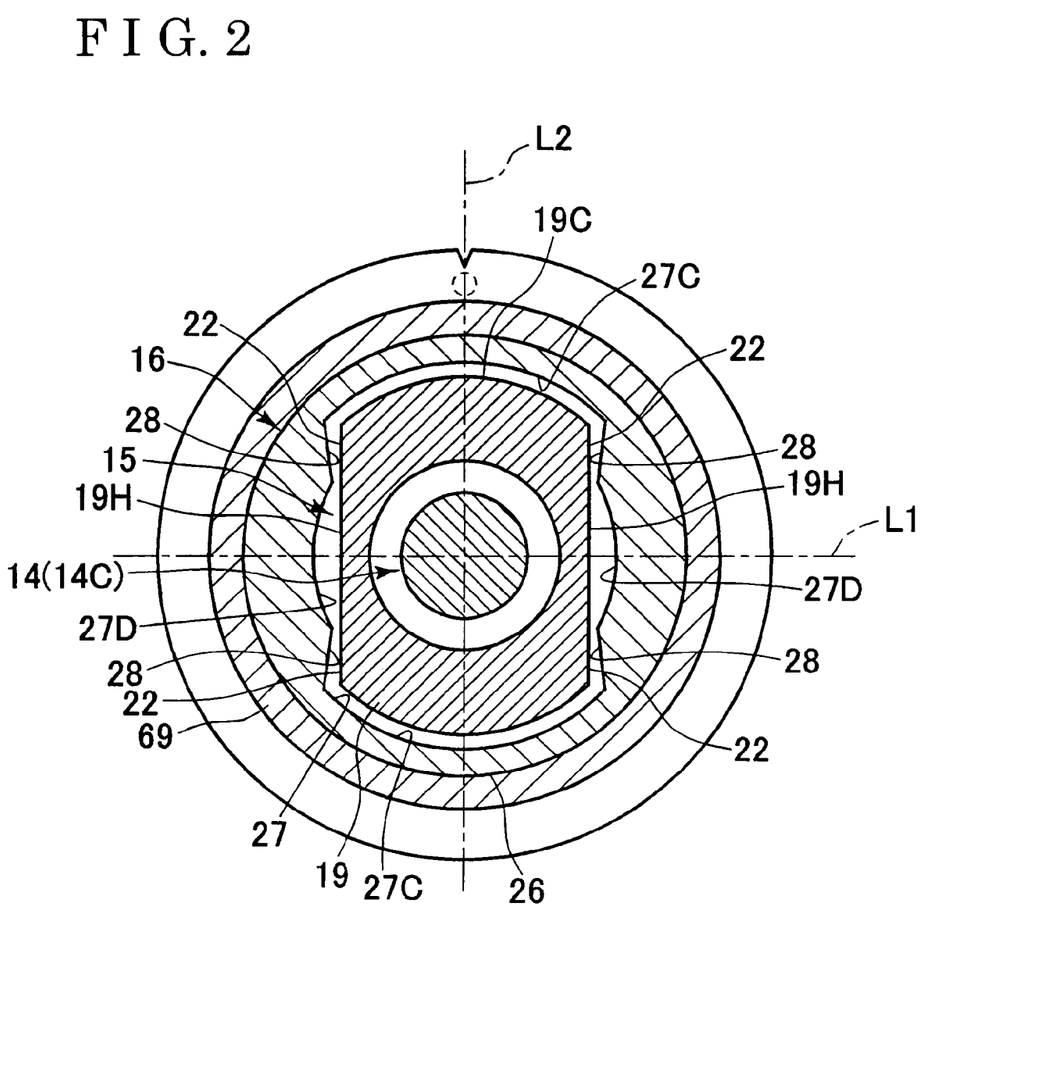
FIG. 2 is a sectional view taken along a line II—II in FIG. 1.

As illustrated in FIG. 2, the first stopping portion 19 having an approximately cylindrical structure includes a pair of parallel flat surfaces 19H and 19H at an outer peripheral surface thereof. Each flat surface 19H has two contact portions 22 at both edge portions thereof adjacent to arc surfaces 19C of the first stopping portion 19. The four contact portions 22 can become in contact with the second extending sleeve 16 which is described later.

As illustrated in FIG. 1, the second extending sleeve 16 is integrally provided at one end of a pinion gear 23. The second extending sleeve 16 is fitted into the tip end portion 14B of the torsion bar 14 and covers an outer periphery of the first stopping portion 19 of the first extending sleeve 15. A toothing portion 24 is formed at an entire outer peripheral surface of the tip end portion 14B, wherein the second extending sleeve 16 is engaged with the tip end portion 14B.

The second extending sleeve 16 hence rotates integrally with the tip end portion 14B. Therefore, when the intermediate portion 14C of the torsion bar 14 is twisted, the first extending sleeve 15 integrally rotated with the base end portion 14A rotates relative to the second extending sleeve 16 integrally rotated with the tip end portion 14B.

At an outer peripheral surface of the second extending sleeve 16, there is a bearing fitting portion 25 fitting the bearing 13, and a second resolver fitting portion 26 arranged at a side of the base end portion 14A rather than at a side of the bearing fitting portion 25. A major diameter of the second resolver fitting portion 26 is substantially the same as a major diameter of the first resolver fitting portion 18. There is a second stopping portion 27 disposed inside the second resolver fitting portion 26.

As illustrated in FIG. 2, the second stopping portion 27 has the same center lines L1 and L2 as the first stopping portion 19 does. The second stopping portion 27 has an approximately long hole shape which is approximately symmetric both in an up and down direction in FIG. 2 and in a right and left direction therein. More particularly, the second stopping portion 27 has a pair of arc surfaces 27C and 27C, each of which diameter is greater than a diameter of the arc surface 19C of the first stopping portion 19. The pair of arc surfaces 27C faces each other in the up and down direction in FIG. 2. The second stopping portion 27 further has a pair of arc surfaces 27D and 27D, each of which diameter is smaller than the diameter of the arc surface 19C of the first stopping portion 19. The pair of arc surfaces 27D faces each other in the right and left direction in FIG. 2. End portions of the arc surfaces 27D are connected to end portions of the adjacent arc surfaces 27C via receiving surfaces 28. The four receiving surfaces 28 can face the contact portions 22 of the first stopping portion 19, respectively.

When the intermediate portion 14C of the torsion bar 14 is twisted in one twisting direction, the first extending sleeve 15 rotates with a predetermined angle in one direction relative to the second extending sleeve 16. In this case, the pair of contact portions 22 symmetric with respect to a point comes in contact with the pair of receiving surfaces 28 of the second stopper portion 27, thereby restraining excessive twist and deformation of the torsion bar 14.

As illustrated in FIG. 1, there is a pair of resolvers 50 and 50 disposed between the cylindrical body 11 and the rotational shaft portion 12. The resolvers 50 and 50 have substantially the same structure. That is, each resolver 50 is provided with a rotor 50R fixed to the rotational shaft portion 12 side and a stator 50S fixed to the cylindrical body 11 side. The rotor 50R includes a power receiving coil portion 52 and an inner coil portion 54. The stator 50S includes a power supply coil portion 51 and an outer coil portion 53. The inner coil portion 54 receives transmitting electricity and is excited by an electromagnetic induction between the power supply coil portion 51 and the power receiving coil portion 52. Therefore, an electrical degree of the rotational shaft portion 12 varies based upon a change of a mutual inductance between the inner coil portion 54 and the outer coil portion 53, which occurs in connection with the rotational angle of the rotational shaft portion 12. For example, each resolver 50 according to the first embodiment of the present invention has eight poles. The inner coil portion 54 mechanically rotates at 45.degree. (=⅛ cycle) in electrical angle of one cycle of the resolver 50.

Figure 3:
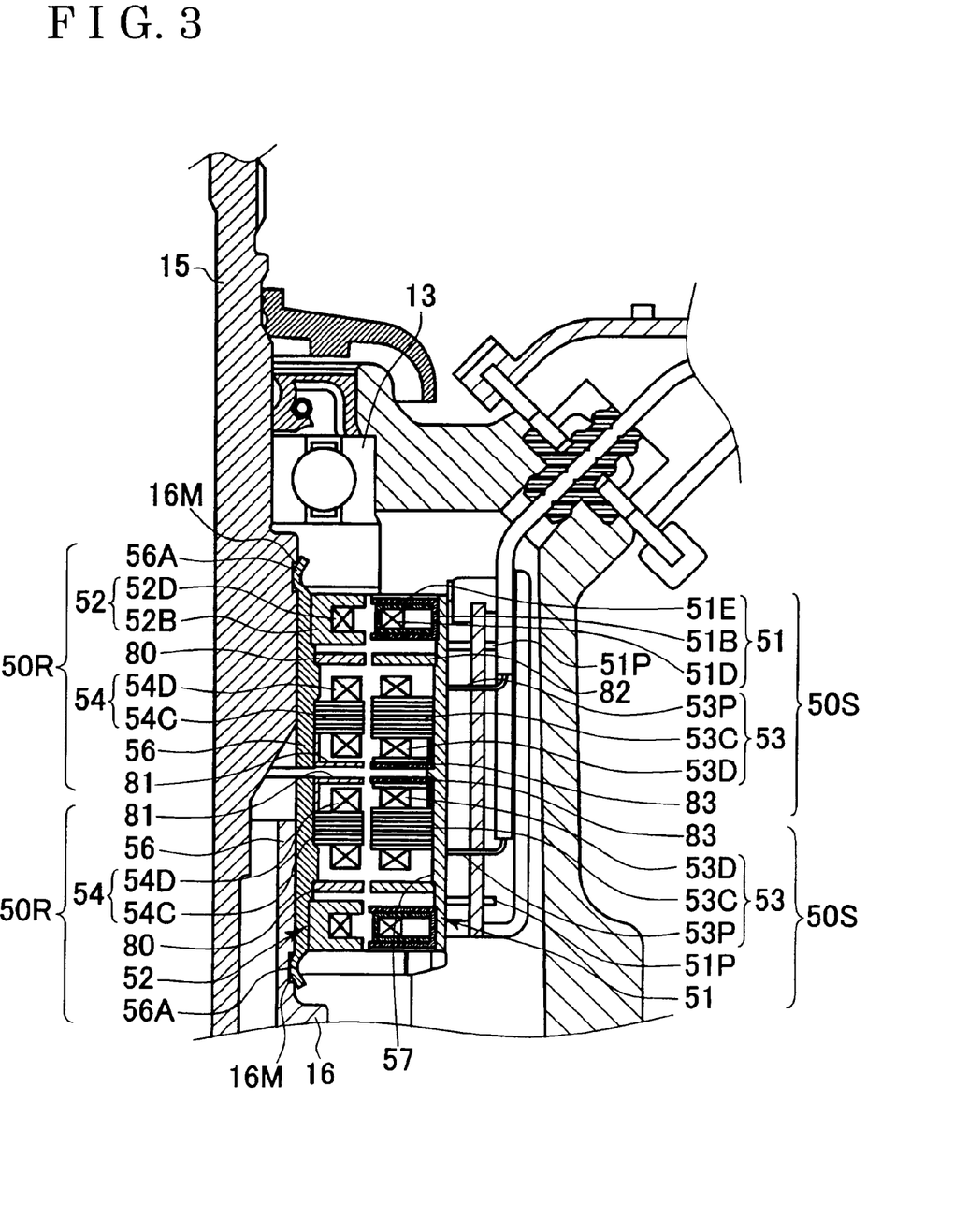
FIG. 3 is a sectional view enlarging a portion of the torque sensor according to the embodiments of the present invention.
Figure 4:
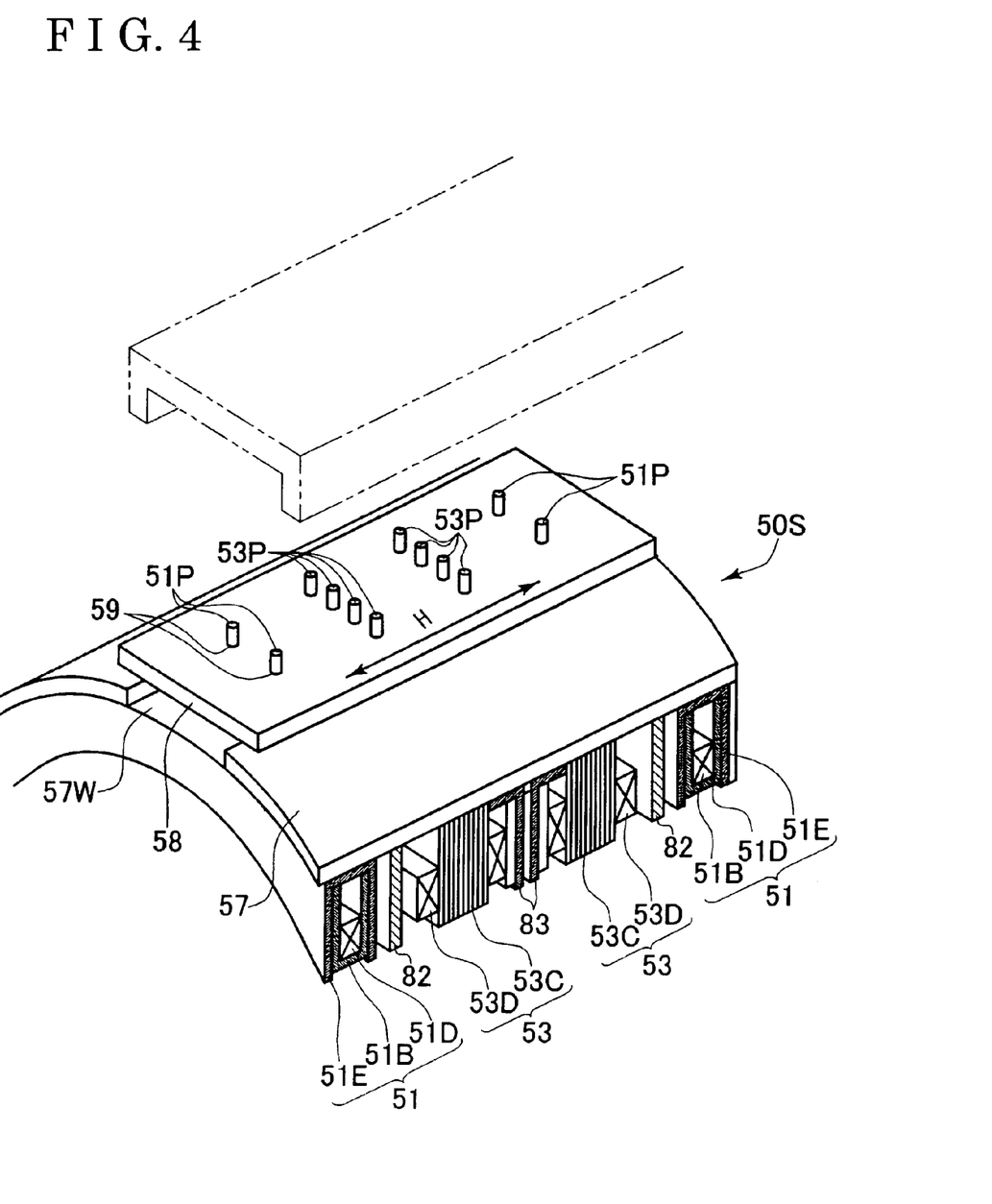
FIG. 4 is a perspective view illustrating a stator with end pins being inserted into a circuit substrate according to the embodiments of the present invention.

As illustrated in FIG. 3, the power receiving coil portion 52 is provided with an electric wire 52D coiled on a bobbin 52B. The power supply coil portion 51 is provided with an electric wire 51D coiled on a bobbin 51B. The bobbin 51B is covered by the other bobbin 51E. Further, the power supply coil portion 51 is provided with an end pin 51P laterally outwardly projecting from the bobbin 51E and is electrically connected with the electric wire 51D.

The inner coil portion 54 is provided with an electric wire 54D coiled on plural teeth of a rotor core 54C. The electric wire 54D is wounded into the respective teeth at a predetermined coiling order and at a predetermined coiling amount. The coiling structures of the respective teeth are slightly different to each other. The outer coil portion 53 is provided with an electric wire 53D coiled on plural teeth of a stator core 53C. The electric wire 53D is wounded into the respective teeth at a predetermined coiling order and at a predetermined coiling amount. The coiling structures of the respective teeth are slightly different to each other.

As illustrated in FIG. 3, the power receiving coil portion 52 and the inner coil portion 54 are integrally fitted into an outer periphery of a rotational cylinder 56. The first resolver fitting portion 18 and the second resolver fitting portion 26 are engaged at an inner periphery of the rotational cylinder 56 and are axially positioned via an engagement piece 56A of the rotational cylinder 56 engaged at an engaging groove 16M of each resolver fitting portion 18 and 26. The power supply coil portion 51 and the outer coil portion 53 are integrally fitted into an inner periphery of an outer sleeve 57. In this case, the power supply coil portion 51 and the outer coil portion 53 can be fitted into the outer sleeve 57 by use of a jig. The outer sleeve 57 includes a pin inserting window 57W at a portion in a circumferential direction of the outer sleeve 57 across an axially entire length thereof.

Next, following explanation will be given for explaining a method of assembling the torque sensor 10 according to the first embodiment of the present invention with reference to FIGS. 4 to 8.

Figure 5:
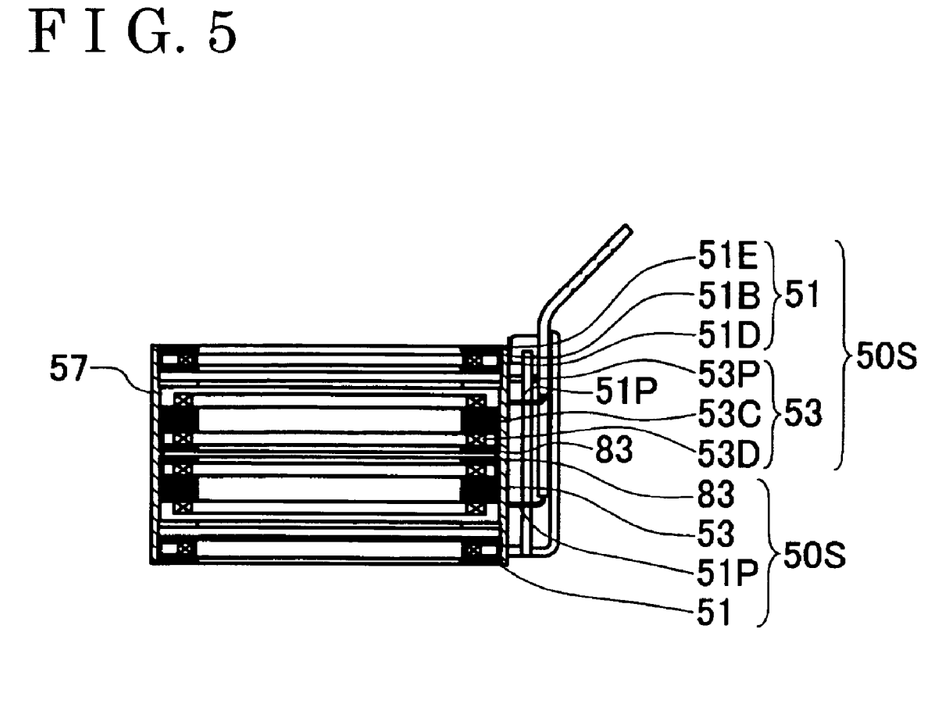
FIG. 5 is a sectional view illustrating the stator.

First of all, a pair of shield discs 83 and 83 are inserted from both end portions of the outer sleeve 57 and are press fitted into the outer sleeve 57. End pins 53P are guided from the openings of the pin inserting window 57W so as to attach the outer coil portions 53 at the outer sleeve 57. Shield discs 82 and 82 are then press fitted into the outer sleeve 57 outside the outer coil portions 53 and 53. The pair of power supply coil portions 51 and 51 is press fitted into the outer sleeve 57 outside the shield discs 82 and 82. As described above, the pair of stators 50S and 50S are completed as illustrated in FIG. 5. Each of the components assembled in the outer sleeve 57 has been applied with adhesive material at a contact surface thereof with the outer sleeve 57.

Figure 7:
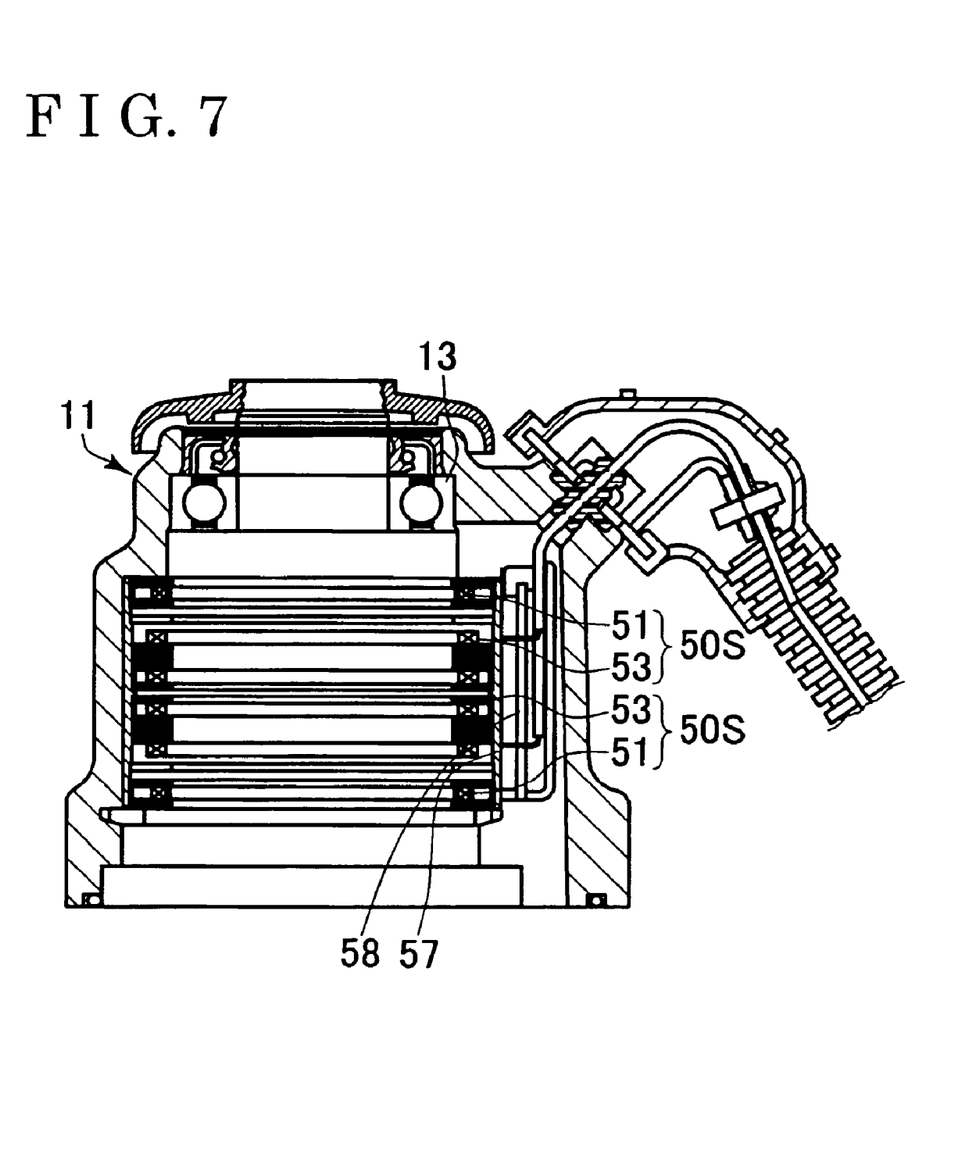
FIG. 7 is a sectional view illustrating a cylindrical body assembled with the two stators.

A circuit substrate 58 is arranged so as to cover the pin inserting window 57W of the outer sleeve 57 from the outside. The end pins 51P of the power supply coil portion 51 of each resolver 50 and the end pins 53P of the outer coil portion 53 of each resolver 50 are respectively inserted into pin holes 59 defined at the circuit substrate 58. At this point, the circumferential directional positions of the power supply coil 51 and the outer coil portion 53 of each resolver 50 are adjusted in order to smoothly insert the respective end pins 51P and 53P into the pin holes 59. While the respective end pins 51P and 53P has been inserted into the pin holes 59, the respective end pins 51P and 53P are soldered at the circuit substrate 58. Therefore, each end pin 53P of the one resolver 50 is arranged in alignment with the corresponding end pin 53P of the other resolver 50 in an axial direction of the outer sleeve 57, i.e., in a direction H in FIG. 4. Therefore, the outer coil portions 53 of both resolvers 50 are effectively positioned so as not to raise an angle displacement relative to each other. The outer coil portions 53 are then fixed at the appropriate positions of the outer sleeve 57 via the adhesive material. As described above, the stators 50S and 50S of the resolvers 50 and 50 are completed as a single component. The positioning of the stators 50S and 50S are performed with high precision by the pin holes 59 and the end pins 53P. The stators 50S and 50S as the single component are then fixed at the cylindrical body 11, as illustrated in FIG. 7. Further, the bearings 13 and 13 are fixed at the cylindrical body 11 so as to rotate the cylindrical body 11 integrally with the rotational shaft portion 12.

Figure 6:
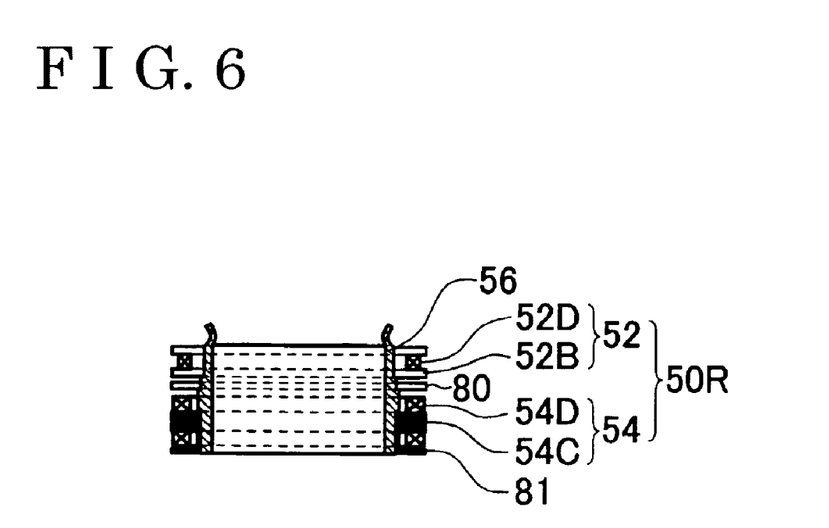
FIG. 6 is a sectional view illustrating a rotor.

Secondly, as illustrated in FIGS. 3 and 6, the power receiving coil portions 52 and the inner coil portions 54 are press fitted into the outer periphery of the rotational cylinder 56. Shield discs 80 and 81 have been press fitted into the outer periphery of the rotational cylinder 56 at both ends of each inner coil portion 54 of each resolver 50. Each of the components press fitted into the rotational cylinder 56 has been applied with adhesive material at a contact surface thereof with the rotational cylinder 56. Each of the components is fixed at the rotational cylinder 56 by the adhesive material so that the rotors 50R and 50R are separately completed, as illustrated in FIG. 6.

Figure 8:
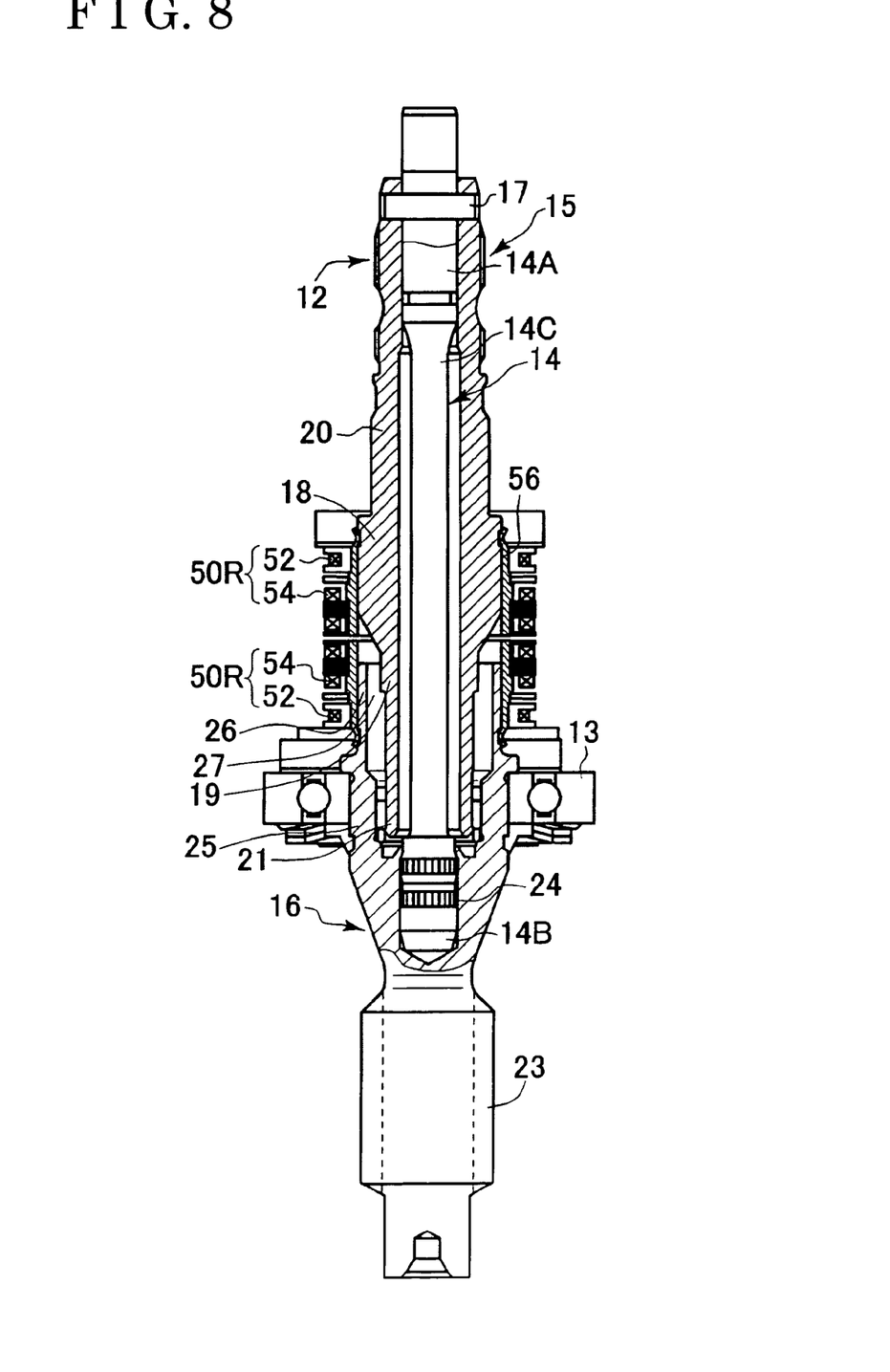
FIG. 8 is a sectional view illustrating a torsion bar assembled with the two rotors.

One of the rotors 50R is press fitted into the first resolver fitting portion 18 of the first extending sleeve 15, while the other rotor 50R is press fitted into the second resolver fitting portion 26 of the second extending sleeve 16. As illustrated in FIG. 8, the first extending sleeve 15 and the second extending sleeve 16 are assembled at the torsion bar 14 and are fastened by the pin 17 and the toothing portion 24. Therefore, the first extending sleeve 15 and the second extending sleeve 16 do not rotate separately from the torsion bar 14. The first and second extending sleeves 15 and 16 are fixedly positioned at the torsion bar 14 by the pin 17 and the toothing portion 24, respectively. Therefore, when the torsion bar 14 has not been applied with load, the inner coil portion 54 of the one resolver 50 can be positioned substantially corresponding to the inner coil portion 54 of the other resolver 50. An integral body illustrated in FIG. 8 can be referred to as a rotor assembly, according to the first embodiment of the present invention.

However, due to an assembling error of the inner coil portion 54 relative to the rotational cylinder 56 upon building the rotor 50R, a press fitting error of the rotor 50R relative to the torsion bar 14, an error characteristic to the respective parts, and so on, there may be a small angle difference (a phase difference) occurring between the inner coil portions 54 and 54 of the pair of resolvers 50 and 50 while no load has been applied to the torsion bar 14. After assembling the rotors 50R and 50R at the torsion bar 14, the angle difference therebetween is measured.

Next, following explanation will be given for explaining a method of measuring the angle difference between the inner coil portions 54 and 54 of the pair of resolvers 50 and 50 as a non-limiting example. The angle difference (the phase difference) is measured under a condition that the cylindrical body 11 having the stators 50S and 50S has been equipped at the rotor assembly including the torsion bar 14 press fitted into the rotors 50R and 50R. That is, the angle difference (the phase difference) is measured by detecting an angle difference between an angle detected by the one resolver 50 and an angle detected by the other resolver 50. As described above, the outer coil portions 53 and 53 are positioned so as not to have an angle difference therebetween. Therefore, the angle difference between the angles detected by the resolvers 50 and 50 can substantially represent the angle difference between the rotors 50R and 50R.

Further, the bearings 13 are assembled so as to rotate the rotational shaft portion 12 relative to the cylindrical body 11.

When the measurement shows that the angle difference between the rotors 50R and 50R is substantially zero or within a predetermined standard range, the torque sensor 10 with the resolvers 50 and 50 is considered as a finished product. On the other hand, when the measurement shows that the angle difference between the rotors 50R and 50R is detected at a certain value or beyond the predetermined standard range, the torque sensor 10 is generally discarded, to date. In light of foregoing, according to the first embodiment of the present invention, the following method can be preferably taken as an example, in which the cylindrical body 11 having the above-described stators 50S and 50S is modified so as to posses an angle difference between the stators 50S and 50s, which is substantially equivalent to the measured angle difference. The modified cylindrical body 11 press fitted into the stators 50S and 50S having the angle difference is assembled at the rotor assembly with the rotors 50R and 50R having the angle difference, whereby enabling to achieve the finished product of the torque sensor 10.

According to the first embodiment of the present invention, the torque sensor 10 detects a torque based upon the angle difference between the angle detected by the resolver 50 and the angle detected by the other resolver 50, i.e., based upon a difference between a rotational angle θ15 of the first extending sleeve 15 detected by the resolver 50 at the first extending sleeve 15 side and a rotational angle θ16 of the second extending sleeve 16 detected by the resolver 50 at the second extending sleeve 16 side. Therefore, even if the rotational angle detected by the resolvers 50 and 50 is not both zero while the torsion bar has been applied with substantially no load, the angle difference between the resolvers 50 and 50 becomes substantially zero as far as the angles detected by both resolvers 50 and 50 corresponds to each other, thereby enabling to obtain the torque with high accuracy.

Following explanation will be given assuming that the angle of the rotor 50R of the resolver 50 at the second extending sleeve 16 side deviates from the angle of the rotor 50R of the resolver 50 at the first extending sleeve 15. The angle deviation is assumed to be an angle a. When the rotational angle θ15 of the first extending sleeve 15 is detected at θ0 by the resolver 50 at the first extending sleeve 15 side, the rotational angle θ16 of the second extending sleeve 16 is detected at (θ0 +a) by the resolver 50 at the second extending sleeve 16 side. In this case, one of the following methods can be taken as a non-limiting example in order to cancel the angle difference between the rotors 50R and 50R: (1) the torque sensor 10 is provided with the cylindrical body 11 having the stator 50S of the resolver 50 at the second extending sleeve 16 side, of which angle deviates at the angle a from the stator 50S of the resolver 50 at the first extending sleeve 15 side, wherein the resolvers 50 both detect the rotational angles θ15 and θ16 at the angle θ0 such that the angle difference between the resolvers 50 becomes substantially zero, and (2) the torque sensor 10 is provided with the cylindrical body 11 having the stator 50S of the resolver 50 at the first extending sleeve 15 side, of which angle deviates at an angle −a from the stator 50S of the resolver 50 at the second extending sleeve 16 side, wherein the resolvers 50 both detect the rotational angles θ15 and θ16 at the angle (θ0 +a) such that the angle difference between the resolvers 50 becomes substantially zero.

As described above, according to the first embodiment of the present invention, the finished product of the torque sensor 10 can be obtained even if the rotor assembly is provided with the rotors 50R and 50R having the angle difference. Therefore, the rotor assembly provided with the rotors 50R and 50R having the angle difference does not have to be discarded any more, thereby enabling to reduce the manufacturing cost of the torque sensor 10.

As described above, when the measurement shows that the angle difference between the rotors 50R and 50R is recognized at the certain value or beyond the predetermined standard range, it is important to manufacture the cylindrical body 11 press fitted into the stators 50S and 50S having an angle difference substantially equivalent to the measured angle difference between the rotors 50R and 50R. In this case, the positions of the pin holes 59 for the outer coil portions 53 and 53 and the power supply coil portions 51 and 51 are shifted in the peripheral direction at the circuit substrate 58. The pin holes 59 can be defined at different portions at the circuit substrate 58 simply by modifying a position coordinate of the pin hole 59 at a design data such as a CAD data.

Figure 9:
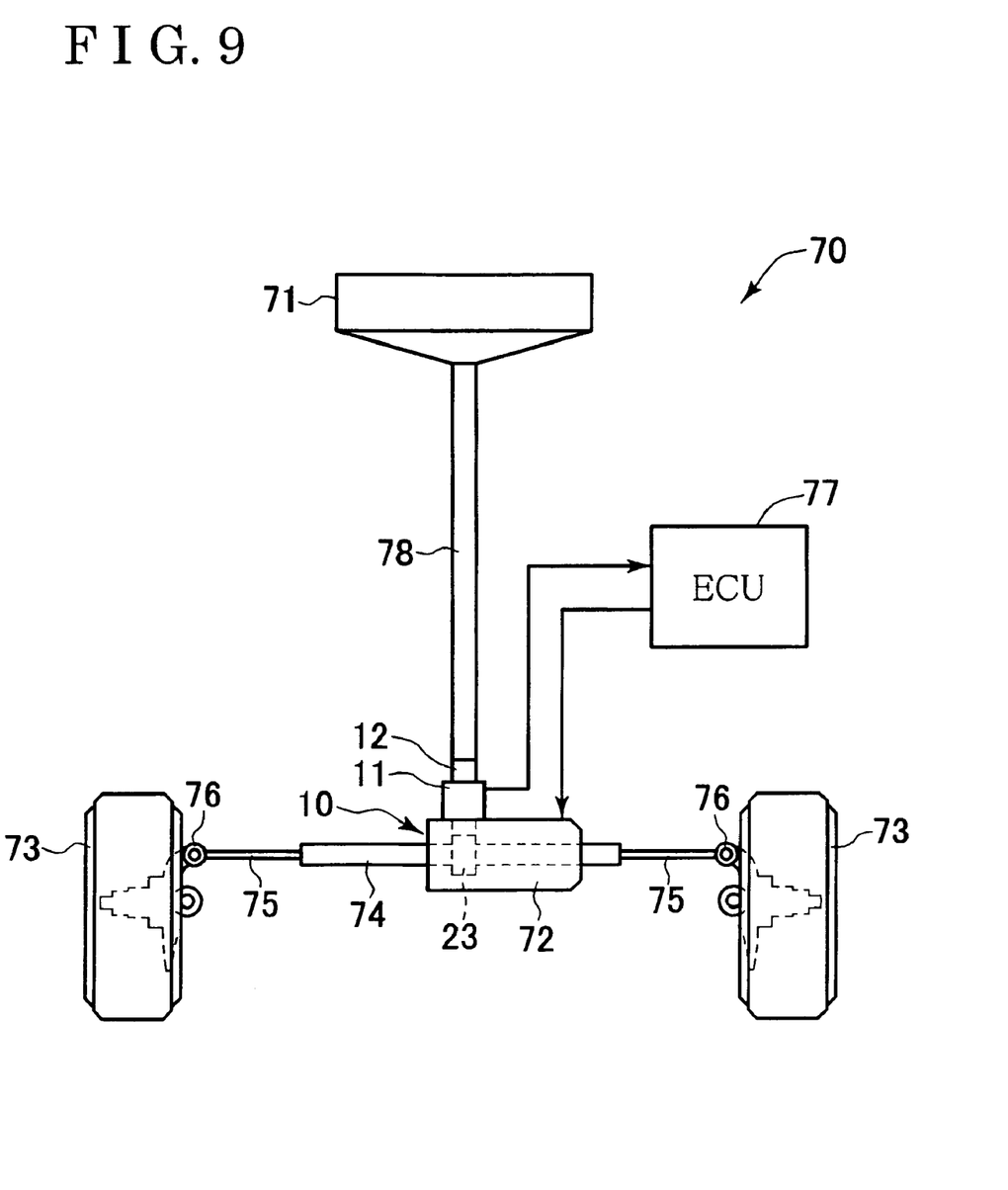
FIG. 9 is a block view schematically illustrating an electric power steering device provided with the torque sensor according to the embodiments of the present invention.

The above-described torque sensor 10 according to the first embodiment of the present invention can be applied for an electric power steering device 70 for a vehicle, as illustrated in FIG. 9. In more details, the rotational shaft portion 12 of the torque sensor 10 is linked to a tip end of a power steering shaft 78 connected with a steering wheel 71. The pinion gear 23 of the rotational shaft portion 12 is engaged with a rack 74 in an actuator 72. The actuator 72 houses an electric motor therein. The rack 74 can be driven in a vehicle lateral direction in response to rotation of an output shaft of the electric motor. Both ends of the rack 74 are connected to rotation supporting portions 76 and 76 for supporting both vehicle wheels 73 and 73 via tie rods 75 and 75. The cylindrical body 11 of the torque sensor 10 is secured at a vehicle main body. The electric wire of each resolver 50 is connected to an electronic control unit (ECU) 77. The ECU 77 controls activation of the actuator 72 based upon a torque applied to the steering shaft 78 detected by the torque sensor 10. Therefore, the rack 74 is driven in the vehicle lateral direction and the wheels 73 and 73 are steered by resultant of forces of a control force for steering the steering wheel 71 by a driver and a force outputted from the actuator 72.

Next, following explanation will be given for explaining an operation of the electric power steering device 70 according to the first embodiment of the present invention. Load is applied to the torsion bar 14 of the torque sensor 10 when the steering wheel 71 is turned, wherein the intermediate portion 14C of the torsion bar 14 is twisted. The first extending sleeve 15 integrally rotated with the base end portion 14A rotates relative to the second extending sleeve 16 integrally rotated with the tip end portion 14B, wherein an electrical angle detected by the resolver 50 at the first extending sleeve 15 side is not substantially equivalent to an electrical angle detected by the resolver 50 at the second extending sleeve 16 side. The ECU 77 computes the torque applied to the rotational shaft portion 12 based upon the angle difference between the electrical angles detected by the resolvers 50. The ECU 77 then controls the activation of the actuator 72 so as to alter the load applied to the rotational shaft portion 12, i.e., a reaction torque applied to the steering wheel 71, as needed.

Figure 10A:
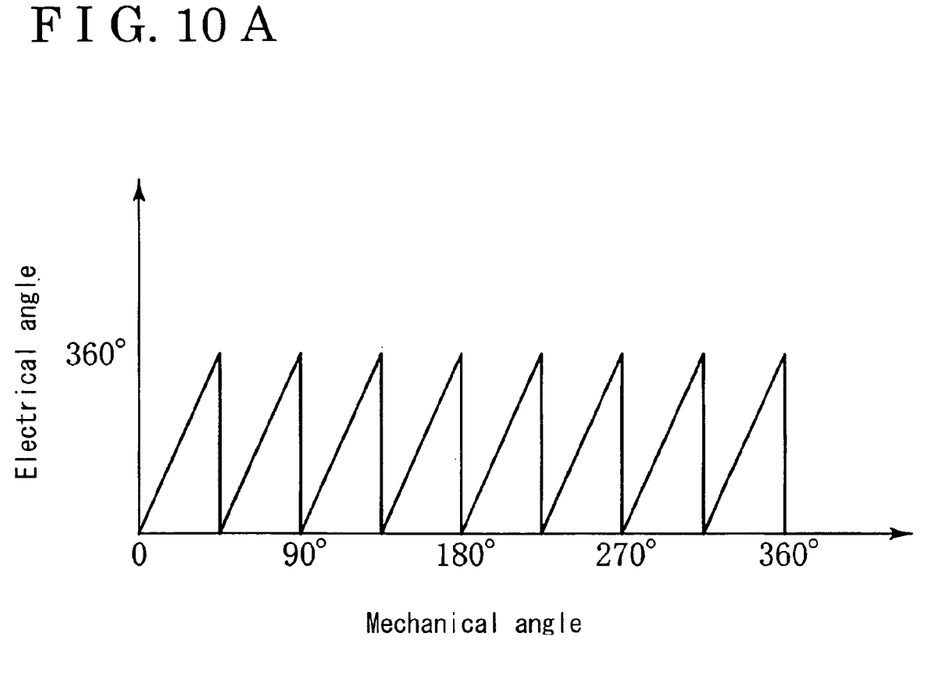
FIG. 10A is a diagram for explaining a relationship between a mechanical angle of a torsion bar and an electrical angle of a resolver according to the embodiments of the present invention.
Figure 10B:
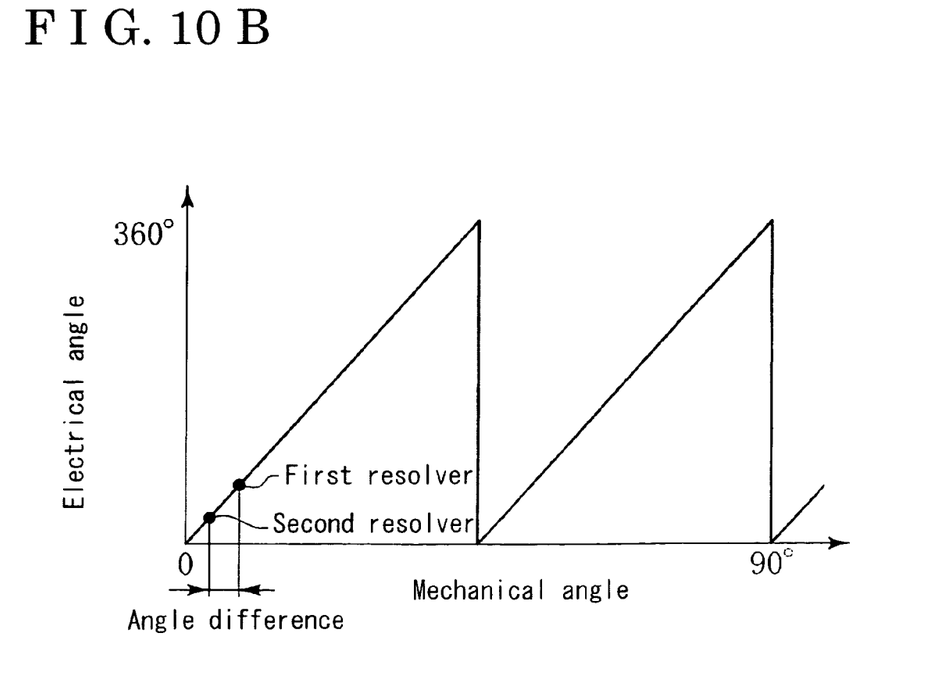
FIG. 10B indicates angles detected by both resolvers and an angle difference between the detected angles under a condition that no load has been applied to the torsion bar according to the embodiments of the present invention.

Next, following explanation will be given for explaining an operation of the torque sensor 10 according to the first embodiment of the present invention. Each resolver 50 of the torque sensor 10 has eight poles. Therefore, as explained in FIG. 10A, a mechanical angle $\theta_{mech}$ 45 degrees (=360 degrees/8) of the torsion bar 14 substantially correspond to the electrical angle $\theta_{elec}$ 360 degrees of each resolver 50, i.e., a cycle of the electrical angle of each resolver 50. FIG. 10B indicates the angles detected by both resolvers 50 and 50 and the angle difference between the angles under a condition that no load has been applied to the torsion bar 14 immediately after press fitting the resolvers 50 into the torsion bar 14. As described above, the angle difference may occur due to the assembling error of each rotor 50R at the torsion bar 14 relative to each stator 50S assembled with high precision, an error characteristic to each rotor 50R, and so on. The angle difference substantially corresponds to the difference between the angle detected by the resolver 50 at the first extending sleeve 15 side and the angle detected by the resolver 50 at the second extending sleeve 16 side. The ECU 77 computes the torque applied to the rotational shaft portion 12 based upon the angle difference. Therefore, when there is the angle difference recognized between the angles detected by the resolvers 50 and 50, the ECU 77 may compute the torque counting in the angle difference.

For example, assuming that the electric power steering device 70 for the vehicle is provided with the torque sensor 10 having the relatively large angle difference, a zero point adjustment of the torque sensor 10, for example by a vehicle manufacturer, may not be able to be effectively performed due to the reaction torque corresponding to the torque detected based upon the angle difference between the two rotors 50R. More particularly, the steering wheel 71 may be unnecessarily steered being applied with the reaction torque, thereby interrupting the zero point adjustment of the torque sensor 10. Conventionally, this sort of problem has been prevented from occurring by defining a certain standard which can be a parameter for judging whether the torque sensor is a finished product or a not applicable product. For example, when the detected torque is substantially equal to 1N or smaller than that ($\leq$1N), the torque sensor 10 is counted as a normal product to be applicable. However, it has been difficult to assemble the rotor 50R with high assembling precision in accordance with the conventional assembling method. Therefore, even if the certain standard is defined as described above, it has been still difficult for the detected torque to satisfy the standard, thereby deteriorating the production capability, discarding the torque sensor not satisfying the standard, and causing excessive manufacturing cost.

However, according to the first embodiment of the present invention, the stators 50S counting in the angle difference of the rotors 50R are employed, thereby generating the angle difference between the two resolvers 50 next to nothing. Further, according to the first embodiment of the present invention, the standard regarding the angle difference of the rotors 50R can be designed at a relatively wide range, thereby enabling to increase the production capability of the torque sensor 10, reducing the waste product and the manufacturing cost.

According to a second embodiment of the present invention, plural types of cylindrical bodies 11 are prepared, such as the cylindrical body 11 having the outer coil portions 53 and 53 of which angle difference is 0 minute, the cylindrical body 11 having the outer coil portions 53 and 53 of which angle difference is 5 minute (1/12 degree), the cylindrical body 11 having the outer coil portions 53 and 53 of which angle difference is 10 minutes (1/6 degree), and so on as non-limiting examples. Meanwhile, the rotors 50R press fitted into the torsion bar 14 are classified by the angle difference of the rotors 50R, for example by Group A of the angle difference ranging from 0 minute to 5 minute, Group B of the angle difference ranging from 5 minute to 10 minute and so on. When the angle difference of the rotors 50R press fitted into the torsion bar 14 is classified by Group A of the angle difference ranging from 0 minute to 5 minute, the cylindrical body 11 having the outer coil portions 53 and 53, of which angle difference is 0 minute, is employed. That is, cylindrical body 11 having the angle difference of the classification corresponding to the measured angle difference of the stators 50R and 50R, is employed so as to build the torque sensor 10. In this case, the maximum value of the difference between the angle difference of the outer coil portions 53 and 53 and the angle difference of the inner coil portions 54 and 54 is designed as the standard value for permitting the torque sensor as the normal product to be applicable. As described above, according to the second embodiment of the present invention, it is preferable to predetermine at which angle differences the outer coil portions 53 and 53 (the stators 50S and 50S) should be assembled at the cylindrical body 11 and at which angle differences the inner coil portions 54 and 54 (the rotors 50R) should be classified. In this case, there is no need to modify the cylindrical body 11 press fitted into the stators 50S and 50S due to the angle difference of the inner coil portions 54 and 54, and there is only need to select the stators 50S and 50S corresponding to the angle difference of the rotors 50R and 50R, thereby improving the production capability during the assembling process.

According to a third embodiment of the present invention, a master stator is prepared in order to measure the angle difference of the rotors 50R and 50R according to the first or second embodiment of the present invention. The master stator is manufactured with high precision.

The principles, the preferred embodiments and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A method of assembling a torque sensor comprising the steps of:
 fixing a first inner coil portion at one end side of a torsion bar, the first inner coil portion being rotatable with the torsion bar;
 fixing a second inner coil portion at an other end side of the torsion bar, the second inner coil portion being rotatable with the torsion bar;
 measuring an angle difference between a circumferential directional angle of the first inner coil portion and a circumferential directional angle of the second inner coil portion at a time when no torque is applied to the torsion bar;
 fixing a first outer coil portion and a second outer coil portion at a housing so as to set a difference between a circumferential angle difference between the first outer coil portion and the second outer coil portion and the measured angle difference between the first inner coil portion and the second inner coil portion within a reference value; and
 rotatably disposing the torsion bar fixed with the first inner coil portion and the second inner coil portion in the housing.

2. A method of assembling a torque sensor according to claim 1, wherein the first inner coil portion and the first outer coil portion configures a first resolver adjusted to detect a rotational angle of the torsion bar based upon a change of a mutual inductance between the first inner coil portion and the first outer coil portion, the second inner coil portion and the second outer coil portion configures a second resolver adjusted to detect a rotational angle of the torsion bar based upon a change of a mutual inductance between the second inner coil portion and the second outer coil portion, and a torque applied to the torsion bar is obtained based upon a difference between the rotational angle of the torsion bar detected by the first resolver and the rotational angle of the torsion bar detected by the second resolver.

3. A method of assembling a torque sensor according to claim 2, further comprising the steps of:
 recognizing whether the difference between the rotational angle of the torsion bar detected by the first resolver and the rotational angle of the torsion bar detected by the second resolver is within a reference value under a condition that the first and second resolvers are fixed at the torsion bar;
 estimating an ideal angle difference between the first and second outer coil portions based upon a relationship between the difference between the angle detected by the first resolver and the angle detected by the second resolver and the reference value when the difference deviates from the reference value;
 selecting the housing provided with the first and second outer coil portions having an angle difference corresponding to the ideal angle difference; and
 assembling the selected housing at the torsion bar.

4. A method of assembling a torque sensor according to claim 3, wherein the reference value is a maximum value for a commercially acceptable product.

5. A method of assembling a torque sensor according to claim 1, wherein the housing having the first outer coil portion and the second outer coil portion is assembled at the torsion bar so as to set the circumferential angle difference between the first outer coil portion and the second outer coil portion substantially equivalent to the measured angle difference between the first inner coil portion and the second inner coil portion.

6. A method of assembling a torque sensor according to claim 5 further comprising the steps of:
 classifying the angle difference between the first inner coil portion and the second inner coil portion based upon an amount of the angle difference;
 preparing at least one housing fixed with the first and second outer coil portions having an angle difference according to every classification of angle differences;
 selecting one of the at least one housings fixed with the first and second outer coil portions having the angle difference of the classification corresponding to the measured angle difference between the first and second inner coil portions; and
 assembling the selected housing at the torsion bar fixed with the first and second inner coil portions.

7. A method of assembling a torque sensor according to claim 1 further comprising the steps of:
 classifying the angle difference between the first inner coil portion and the second inner coil portion based upon an amount of the angle difference;

preparing at least one housing fixed with the first and second outer coil portions having an angle difference according to every classification of angle differences;

selecting one of the at least one fixed with the first and second outer coil portions having the angle difference of the classification corresponding to the measured angle difference between the first and second inner coil portions; and assembling the selected housing at the torsion bar fixed with the first and second inner coil portions.

8. A method of assembling a torque sensor according to claim 1, wherein the first and second outer coil portions are fixed at an outer sleeve incorporating the angle difference corresponding to the measured angle difference, and the first and second outer coil portions are assembled at the housing via the outer sleeve.

9. A torque sensor comprising;
a torsion bar rotationally disposed in a housing;
a first outer coil portion fixed at the housing;
a second outer coil portion fixed at the housing;
a first inner coil portion fixed at the torsion bar;
a second inner coil portion fixed at the torsion bar;
a first resolver having the first outer coil portion and the first inner coil portion and fixed at one end side of the torsion bar, whereby the first resolver may detect a rotational angle of the torsion bar based upon a change of a mutual inductance between the first outer coil portion and the first inner coil portion; and
a second resolver having the second outer coil portion and the second inner coil portion and fixed at an other end side of the torsion bar, whereby the second resolver may detect a rotational angle of the torsion bar based upon a change of a mutual inductance between the second outer coil portion and the second inner coil portion,
wherein an angle difference between a circumferential directional angle of the first outer coil portion and a circumferential directional angle of the second outer coil portion is set to be substantially equivalent to an angle difference between a circumferential directional angle of the first inner coil portion and a circumferential directional angle of the second inner coil portion at a time when no torque is applied to the torsion bar.

10. A torque sensor according to claim 9 further comprising:
an outer sleeve fixing the first and second outer coil portions at the housing, the outer sleeve having a window opening at a portion along a circumferential direction of the outer sleeve across an axial direction thereof;
a control substrate having at least one pin hole and covering the window; and
at least one pin radially outwardly extending from each of the first and second outer coil portions and inserted into the at least one pin hole of the control substrate.

11. An electric power steering device provided with a torque sensor connected to a steering shaft rotated in response to an operation of a steering wheel and assembled by a method including the steps of:
fixing a first inner coil portion at one end side of a torsion bar, the first inner coil portion being rotatable with the torsion bar;
fixing a second inner coil portion at an other end side of the torsion bar, the second inner coil portion being rotatable with the torsion bar;
measuring an angle difference between a circumferential directional angle of the first inner coil portion and a circumferential directional angle of the second inner coil portion at a time when no torque is applied to the torsion bar;
fixing a first outer coil portion and a second outer coil portion, whose circumferential angle difference is substantially equivalent to the measured angle difference between the first inner coil portion and the second inner coil portion, at a housing; and
rotatably disposing the torsion bar fixed with the first inner coil portion and the second inner coil portion in the housing.

12. An electric power steering device provided with a torque sensor connected to a steering shaft rotated in response to an operation of a steering wheel, including:
a torsion bar rotationally disposed in a housing;
a first outer coil portion fixed at the housing;
a second outer coil portion fixed at the housing;
a first inner coil portion fixed at the torsion bar;
a second inner coil portion fixed at the torsion bar;
a first resolver having the first outer coil portion and the first inner coil portion and fixed at one end side of the torsion bar, wherein the first resolver may detect a rotational angle of the torsion bar based upon a change of a mutual inductance between the first outer coil portion and the first inner coil portion; and
a second resolver having the second outer coil portion and the second inner coil portion and fixed at an other end side of the torsion bar, wherein the second resolver may detect a rotational angle of the torsion bar based upon a change of a mutual inductance between the second outer coil portion and the second inner coil portion,
wherein an angle difference between a circumferential directional angle of the first outer coil portion and a circumferential directional angle of the second outer coil portion is set to be substantially equivalent to an angle difference between a circumferential directional angle of the first inner coil portion and a circumferential directional angle of the second inner coil portion at a time when no torque is applied to the torsion bar.

* * * * *